Patented Feb. 20, 1940

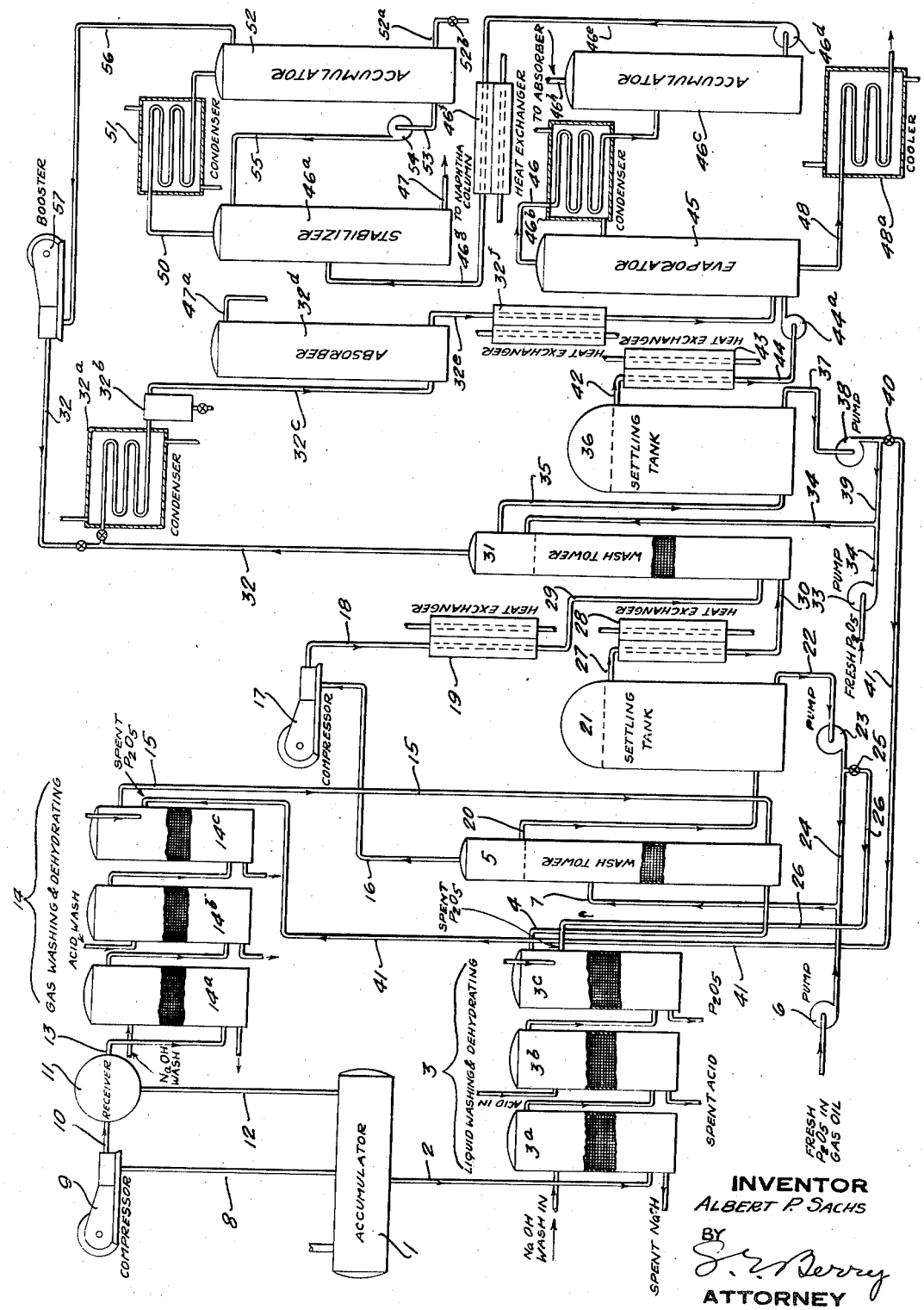

2,191,043

UNITED STATES PATENT OFFICE 2,191,043

TREATMENT OF OILS WITH PHOSPHORUS PENTOXIDE

Albert P. Sachs, New York, N. Y., assignor to Petroleum Conversion Corporation, Elizabeth, N. J., a corporation of Delaware Application February 4, 1938, Serial No. 188,608

6 Claims. (Cl. 196—35)

My present invention relates to improvements in the use of phosphorus pentoxide ($P_2O_5$) in the treatment of hydrocarbons, especially in the purification of crude gasoline distillates and the recovery of values from the gases produced or employed in the cracking operations. Malishev, (vide U. S. Patent No. 2,055,415), has already shown that $P_2O_5$ possesses catalytic activity in the polymerization and condensation of olefinic or other unsaturated hydrocarbons, which activity has also been found to result in a refining action. The present invention is concerned with an improved application of these properties of $P_2O_5$ to the refining of crude gasoline distillate and the recovery of useful compounds from the gases produced or employed in the cracking reaction. In this manner the olefinic content of the cracking or other gases is converted to liquids suitable for use as motor fuel, while the liquid thus produced as well as the cracked gasoline is refined.

In the cracking of hydrocarbons, especially in vapor phase, the reaction products are vapors at high temperature which are normally recovered to yield a certain amount of fuel oil, heavy gasoline distillate, light gasoline distillate and cracked gases which may be re-used in gas heat-carrier processes as the heat-carrying medium for the cracking process. The heavy gasoline distillate is obtained by direct condensation, the light gasoline distillate by absorption from the gases by subsequent stripping, and the total distillate is stabilized. In the operation hitherto considered normal the stabilized distillate is refined, as by use of concentrated zinc chloride solution or by certain clays. The gases, particularly the stabilizer tops, may be subjected to thermal or pressure polymerization, or otherwise disposed of. In other vapor phase cracking processes not employing a heat-carrying gas, the ratio of gas to primary distillate is as a rule much smaller.

The use of $P_2O_5$ as a polymerizing or refining agent suffers to a certain extent from the difficulty that the compounds which interact with or are catalytically affected by the $P_2O_5$ cause the $P_2O_5$ to agglomerate or form lumps. I overcome this difficulty by pretreating the hydrocarbon liquids and the hydrocarbon gases to be subjected to the action of $P_2O_5$ with partially spent $P_2O_5$ the acid nature of which simultaneously causes not only the removal of nitrogenous and basic substances which amongst others would otherwise undesirably diminish the catalytic effect of the $P_2O_5$ in the main course of the treatment but also the dehydrating nature of which removes actual water and such potential water as may be present in oxygenated compounds and which also would tend to coat the active particles of $P_2O_5$ with a non-reactive film of phosphoric acid or other compounds resulting from the reaction of $P_2O_5$ with substances present in the material to be treated.

In my improved process I preferably simultaneously treat the gas and the distillate (each of which has been suitably prepared for the treatment) with $P_2O_5$ preferably in one or more stages whereby the gaseous olefins are caused to react to some degree with olefins or aromatic compounds present in the liquid, and the liquid polymers formed from the gas are in the same operation added to the gasoline distillate, while the presence of the gas aids in the suspension and distribution of $P_2O_5$ throughout the fluids being treated. By conducting the operation in stages involving different temperatures, various of the reactions involved are subjected to temperature and, if necessary, pressure conditions most favorable. Thus, one stage is preferably carried out at atmospheric temperatures which are conducive to ethane polymerization and to alkylation, while the second stage is carried out at preferably around 400° F., which is required by other olefins. Further stages may be added if desired and especially if the distillate is not to be redistilled.

My invention will be best understood by reference to the following detailed description taken with the accompanying drawing illustrating a plant constituting a preferred embodiment of the invention.

In this figure an accumulator 1 receives its charge of raw gasoline distillate and gas from the condensers of the cracking unit (not shown). The liquid passes through line 2 to a washing and dehydrating system 3 which may consist of a tower 3a for washing with dilute caustic, a tower 3b for washing with dilute sulfuric or phosphoric acid, and a tower 3c where the washed and settled distillate is mingled with spent $P_2O_5$ suspension from settlers 21 and 36 (to be more particularly described hereinafter) to accomplish the dehydration and pretreatment of the distillate, suitable connections being provided for the admission and withdrawal of the treating reagents and for passing the gasoline from one tower to the other, all as indicated. The caustic solution acts to remove hydrogen sulfide, some mercaptans and any acidic substances, while the acid wash removes any nitrogen bases. The action of the partially spent $P_2O_5$ in the tower 3c is, as above pointed out, highly important, since thereby substances which consume the $P_2O_5$ (without producing any desired polymers or condensation products) are substantially removed. The dry pretreated distillate passes by line 4 to $P_2O_5$-contact tower 5 where it is contacted with a suspension, suitably prepared, of $P_2O_5$ in heavy kerosene or gas oil. This heavy kerosene or gas oil is preferably pretreated with partially spent $P_2O_5$ to remove substances which consume or reduce the effectiveness of $P_2O_5$. Pump 6 receives the suitably prepared suspension of $P_2O_5$ and transfers it by line 7 to tower 5 at a point desirably above the midpoint of the liquid column therein.

Reverting to accumulator 1, the gas component leaves by line 8, is compressed by compressor 9, passes by line 10 to intermediate receiver 11 from which any condensate is returned by line 12 to accumulator 1. The compressed gas from intermediate receiver 11 passes by line 13 to the gas washing pretreating and dehydrating system 14 which is substantially similar to system 3 above described, with such changes as are necessary, so that system 14 may wash the gas with dilute NaOH solution in tower 14a, with dilute sulfuric or phosphoric acid in tower 14b and with spent $P_2O_5$ suspension in tower 14c. The dry gas passes from system 14 by line 15 to tower 5 at a point desirably below the midpoint thereof, the gas bubbling up through the distillate and $P_2O_5$-suspension at substantially atmospheric temperature, its action aiding the suspension and affording the agitation desirable to thoroughly distribute the suspension throughout the liquid undergoing treatment. Suitable distributor heads or other devices (not shown) may be provided for distributing the gas in finely divided condition throughout the mass of liquid in the tower 5, and baffle plates may be provided to extend the path and increase the time of contact of the gas with the $P_2O_5$-suspension in the distillate.

The partially depleted gas leaves tower 5 by line 16, is compressed by compressor 17, passes by line 18 to heat-exchanger 19 where it is heated by indirect contact with hot fluids (as, for example, from the cracking unit) to a temperature of preferably 300–400° F. The liquid in tower 5 overflows or is decanted through pipe 20 into settling tank 21 which is of such diameter and height as to permit most of the suspended $P_2O_5$ to settle out. Pump 23 draws off concentrated $P_2O_5$-suspension through line 22 leading from the bottom of the settler 21 and discharges it by line 24 into line 7 in order to produce recirculation of $P_2O_5$ through the tower 5. From time to time, or continuously, $P_2O_5$-suspension may be withdrawn from the circuit by means of valve 25 and line 26. The partially spent $P_2O_5$-suspension withdrawn by line 26 may then be transferred to either or both the pretreating and dehydrating tower 3c of the distillate washing, pretreating and dehydrating system 3, or to the pretreating and dehydrating tower 14c of the gas washing system 14. As shown in the drawing, it is fed to tower 3c by line 26 having therein valve 25. A substantially $P_2O_5$-free distillate overflows from settler 21 through line 27 and passes thence to heater 28 where it is heated by indirect contact with fluids (as, for example, from the cracking unit) to a temperature of preferably 300–400° F. The heated gas from heat-exchanger 19 passes by line 29 while the heated distillate (which may be partly vaporized) from heater 28 passes by pipe 30 to respective points adjacent the bottom of tower 31. This column, as in the case of column 5, may have gas distributing means and baffles, etc., not shown, all of which act to extend the path and increase the time of contact of the gas with the $P_2O_5$-suspension in the distillate. The pressure in the system is maintained at a suitable value to prevent excessive vaporization in tower 31, a suitable pressure being 50–250 pounds per square inch gage. The depleted gas leaves tower 31 by line 32 by which it passes first to a condenser 32a maintained under pressure to condense out liquid in collecting box 32b, which liquid may be returned by means not shown to tower 31 or directly to the stabilizer. The cooled gas passes by line 32c to an absorber 32d where it is stripped of its content of $C_4$ and higher boiling constituents by means of a suitable menstruum which may be a suitable naphtha fraction within the boiling range of the gasoline to be produced. The enriched naphtha menstruum may be returned to the evaporator 45 to be mentioned below, by pipe 32e. Pump 33 pumps a suitably prepared suspension of $P_2O_5$ in heavy kerosene or gas oil by line 34 into tower 31, such suspension entering the tower above the midpoint of the liquid column therein. The overflow from tower 31 passes to settler 36 by line 35, which settler is similar to settler 21 and acts to separate the $P_2O_5$ from the distillate. Pump 38 draws off concentrated $P_2O_5$-suspension by line 37 in the bottom of settler 36 and discharges it by line 39 into line 34 to bring about recirculation of $P_2O_5$-suspension through the tower 31. From time to time or continuously, $P_2O_5$-suspension may be withdrawn from the circuit by means of valve 40 in line 41 and the partially spent $P_2O_5$-suspension transferred to the pretreating and dehydrating tower or towers in the systems 3 and 14 previously mentioned, as in the case of the $P_2O_5$ from settler 21. As shown in the drawing, it is conveyed by line 41 to tower 14c. The substantially $P_2O_5$-free distillate under system pressure overflows from settler 36 through line 42 to heat-exchanger or heater 43 where it is heated by indirect contact with hot fluids (as, for example, combustion gases or hot fluids from the cracking system, not shown) to a temperature sufficient to provide for the complete flash evaporation of the gasoline content of the distillate in evaporator 45 to which the distillate is transferred from heat exchanger 43 by line 44, aided by pump 44a. The overhead distillate from evaporator 45 passes by line 46 to the condenser 46b, thence to accumulator 46c from which the liquid condensate is pumped by pump 46d through line 46e to heat exchanger 46f (which raises the temperature sufficiently for the stabilization distillation) and thence by line 46g to stabilizer 46a. The gas from accumulator 46c leaves by line 46h and is conveyed by the requisite compressor and connections not shown to absorber 32d. A naphtha fraction is produced from the stabilized gasoline leaving the stabilizer 46a by conducting some of the stabilizer bottoms through line 47 to a naphtha column (not shown) wherein the stabilized gasoline is topped, the said tops being returned to the evaporator or stabilizer while the topped naphtha is conducted by line 47a for use as a menstruum in the absorber 32d and the enriched menstruum may be returned by line 32e after suitable heating under pressure in heat exchanger 32f to provide heat for flash evaporation to evaporator 45. The bottoms containing all materials heavier than gasoline leave the evaporator 45 by line 48, and after cooling in cooler 48a are washed with dilute alkaline solutions to remove any $P_2O_5$ or acidic phosphorus compounds and the washed bottoms may be used as a cracking stock, as suspension medium for $P_2O_5$ or as fuel oil.

The stabilizer overhead passes by line 50 to condenser 51 and thence to accumulator 52 from which the liquid leaves by line 53, pump 54 and line 55 to be returned as reflux to stabilizer 46a while the gas leaves by line 56 having therein the booster 57 by means of which it may be passed back to cooler 32a wherein the saturated $C_3$ and $C_4$ hydrocarbons comprising largely such stabilizer overhead (the unsaturated $C_3$ and $C_4$ hydrocarbons having been used up by the $P_2O_5$ treatments) are thereby recovered and added to the collecting box 32b. Such saturated hydrocarbons may also be drawn off from accumulator 52 by line 52a controlled by valve 52b and may either be sold for various uses, or thermally decomposed for re-use in the present system. The gas escaping condensation in accumulator 52 or in collecting box 32b then passes through the absorber 32d by means of the line 32c, so that all lean gas of the system leaves the same by way of the absorber.

An important advantage of my invention is that by properly operating the system a motor fuel may be produced which is water white, color-stable and gum-free. A further advantage is that yields are considerably increased as the effect of the $P_2O_5$ is to convert the gaseous unsaturates into motor fuel and because of the polymerization of the butenes to permit additional amounts of butane and saturated gases to be incorporated in the stabilized gasoline. Furthermore, the effect of the improved process is to increase the octane number of the distillate considerably, due probably to the production of polymers and condensed compounds of a cyclic or alkylated cyclic nature which are known to have high anti-knock values. A still further advantage is that the cracking, refining and polymerization and the utilization of the liquid and gaseous products of cracking are made one continuous process.

It will be understood, however, that various changes may be made in the described process without departing from the spirit of the invention or the scope of the appended claims.

I claim:

1. In the treatment of low boiling hydrocarbons with $P_2O_5$ for the purpose of purifying said hydrocarbons and utilizing the olefinic compounds therein, the steps which consist in preparing said hydrocarbons for said treatment by removing therefrom substances soluble in dilute acid, then drying said hydrocarbons by contact therewith of $P_2O_5$ of not greater impurity than that which has been previously used in the main purifying treatment infra, and which is effective to remove potential water forming compounds detrimental to the action of the relatively fresh $P_2O_5$ in said treatment infra, passing a liquid stream of the so pretreated hydrocarbon to the lower part of a previously formed column thereof, adding a suspension in hydrocarbon liquid of relatively fresh $P_2O_5$ to the upper part of said column, decanting from adjacent the top of said column a stream of said hydrocarbon laden with $P_2O_5$, slowing up the flow of such stream sufficiently to cause said added $P_2O_5$ to settle, recovering in concentrated form said $P_2O_5$ in suspension thus settled out, and recovering said $P_2O_5$ treated hydrocarbons.

2. The process of simultaneously treating crude gasoline distillate and hydrocarbon gases containing olefins, consisting in removing substances soluble in dilute acid from both distillate and gas, drying both distillate and gas and treating same with $P_2O_5$ of not greater impurity than that which has been previously used in the main purifying treatment infra, and which is effective to remove potential water forming compounds detrimental to the action of the fresh $P_2O_5$ in said treatment infra, suspending relatively fresh $P_2O_5$ in a stream of said distillate and passing said gas therethrough whereby both distillate and gas are simultaneously treated by said $P_2O_5$, the liquid polymers formed from said gas being added to said liquid hydrocarbon, and the suspension of the $P_2O_5$ in the distillate aided by the flow of said gas, thereafter causing the $P_2O_5$ to settle, passing the treated gaseous stream to an absorber for recovery of light ends therein and subjecting the treated distillate to vaporization to effect removal therefrom of compounds distilling above the desired gasoline end point.

3. The process of simultaneously treating crude gasoline distillate and hydrocarbon gases containing olefins, consisting in removing substances soluble in dilute acid from both distillate and gas, drying both distillate and gas and treating same with $P_2O_5$ of not greater impurity than that which has been previously used in the main purifying treatment infra, and which is effective to remove potential water forming compounds detrimental to the action of the fresh $P_2O_5$ in said treatment infra, suspending relatively fresh $P_2O_5$ in a stream of said distillate in a first treating zone and passing said gas therethrough whereby both distillate and gas are simultaneously treated by said $P_2O_5$, the liquid polymers formed from said gas added to said liquid hydrocarbon, and the suspension of the $P_2O_5$ in the distillate aided by the flow of said gas, thereafter causing the $P_2O_5$ to settle, removing the distillate from said first treating zone, heating same, and passing the heated distillate into a second zone of treatment having a higher temperature than said first zone, wherein a fresh suspension of $P_2O_5$ is added, removing the gas from the first zone of treatment, compressing and heating same, adding the heated gas to said second zone of treatment, passing the thus treated gas to an absorber to recover values therefrom, separating the thus treated distillate from said $P_2O_5$ added in said second zone of treatment, and distilling same to recover a new distillate of desired end boiling point.

4. In the treatment of low boiling hydrocarbons with $P_2O_5$ in which said hydrocarbons are first treated to remove acid and alkali soluble impurities if present, the method which consists in treating the thus purified hydrocarbons with $P_2O_5$ in stages involving a preliminary stage and an intensive stage and wherein relatively pure $P_2O_5$ is used in the intensive stage and the spent $P_2O_5$ therefrom is used in the preliminary stage to remove from said treated hydrocarbon the potential water forming compounds so as to prevent agglomeration of the $P_2O_5$ in the intensive stage, and carrying out said intensive stage by the simple mingling of the hydrocarbon and the $P_2O_5$.

5. In the method of treating low boiling liquid hydrocarbons with $P_2O_5$ for the purpose of purifying same and utilizing the olefinic compounds therein, the steps which consist in first removing therefrom substances soluble in dilute acid, subjecting the so treated hydrocarbon to the action of partially spent $P_2O_5$ to remove free moisture and compounds producing moisture upon subsequent reaction with $P_2O_5$, passing a liquid stream of so pretreated hydrocarbon to the lower part of a previously formed column thereof, adding a suspension of relatively fresh $P_2O_5$ to the upper part of said column, decanting from adjacent the top of said column a stream of said hydrocarbon laden with $P_2O_5$, slowing up the flow of said stream sufficiently to cause said added $P_2O_5$ to settle, recovering in concentrated form said $P_2O_5$-suspension thus settled out, recovering said $P_2O_5$ treated hydrocarbons and returning the partially spent $P_2O_5$ so obtained to contact with the hydrocarbons undergoing treatment for removal of moisture.

6. The process of simultaneously treating crude gasoline distillate and hydrocarbon gases containing olefins, consisting in removing substances soluble in dilute acid from both distillate and gas, drying both distillate and gas and treating same with $P_2O_5$ of not greater impurity than that which has been previously used in the main purifying treatment infra, and which is effective to remove potential water forming compounds detrimental to the action of the fresh $P_2O_5$ in said treatment infra, suspending relatively fresh $P_2O_5$ in a stream of said distillate and passing said gas therethrough whereby both distillate and gas are simultaneously treated by said $P_2O_5$, the liquid polymers formed from said gas being added to said liquid hydrocarbon, and the suspension of the $P_2O_5$ in the distillate aided by the flow of said gas, thereafter causing the $P_2O_5$ to settle, passing the treated gaseous stream to an absorber for recovery of light ends therein and subjecting the treated distillate to vaporization to effect removal therefrom of compounds distilling above the desired gasoline end point, utilizing a distillate from said vaporization step as the absorber menstruum and returning to the zone of vaporization the enriched absorber menstruum.

ALBERT P. SACHS.

CERTIFICATE OF CORRECTION.

Patent No. 2,191,043.  February 20, 1940.

ALBERT P. SACHS.

It is hereby certified that error appears in the printed specification of the above numbered patent requiring correction as follows: Page 1, second column, line 24, for "ethane" read ethene; and that the said Letters Patent should be read with this correction therein that the same may conform to the record of the case in the Patent Office.

Signed and sealed this 9th day of April, A. D. 1940.

Henry Van Arsdale,
Acting Commissioner of Patents.

(Seal)